United States Patent
Yeom

(10) Patent No.: US 7,653,291 B2
(45) Date of Patent: Jan. 26, 2010

(54) WATER PROOF CASE FOR DIGITAL CAMERA

(76) Inventor: Myeong-Hwan Yeom, #1625-15, Dangu-dong, Wonju-Si, Gangwon-do (KR) 220-965

( * ) Notice: Subject to any disclaimer, the term of this patent is extended or adjusted under 35 U.S.C. 154(b) by 259 days.

(21) Appl. No.: 11/913,644

(22) PCT Filed: Apr. 17, 2006

(86) PCT No.: PCT/KR2006/001412

§ 371 (c)(1),
(2), (4) Date: Nov. 8, 2007

(87) PCT Pub. No.: WO2006/121246

PCT Pub. Date: Nov. 16, 2006

(65) Prior Publication Data

US 2008/0193113 A1 Aug. 14, 2008

(30) Foreign Application Priority Data

May 6, 2005 (KR) .................. 20-2005-0012688 U

(51) Int. Cl.
G03B 17/08 (2006.01)
G02B 23/16 (2006.01)
H04N 9/47 (2006.01)
H04N 5/225 (2006.01)
B65D 85/38 (2006.01)

(52) U.S. Cl. .............................. 396/27; 396/29; 348/81; 348/376; 359/513; 224/908; 206/316.2

(58) Field of Classification Search .................. 396/27, 396/25, 29; 348/81, 373, 376; 359/507, 359/513; 224/908; 206/316.2

See application file for complete search history.

(56) References Cited

U.S. PATENT DOCUMENTS

| 4,071,066 | A | * | 1/1978 | Schaeffer | 206/316.2 |
| 4,176,701 | A | * | 12/1979 | Welgan | 206/316.2 |
| 4,549,589 | A | * | 10/1985 | Nguyen | 206/316.2 |
| 5,953,543 | A | * | 9/1999 | Shepper | 396/29 |
| 7,106,959 | B2 | * | 9/2006 | Sato | 396/27 |
| 2002/0090212 | A1 | * | 7/2002 | Shimamura et al. | 396/27 |
| 2005/0115852 | A1 | * | 6/2005 | Funahashi et al. | 206/316.2 |
| 2006/0096874 | A1 | * | 5/2006 | Doran | 206/316.2 |

* cited by examiner

*Primary Examiner*—Rochelle-Ann J Blackman
(74) *Attorney, Agent, or Firm*—Stephen M. Nipper; Dykas, Shaver & Nipper, LLP

(57) ABSTRACT

The present invention relates to a water proof case for a digital camera. The water proof case for a digital camera according to the present invention comprises a housing having an inner space to accommodate the digital camera, an upper and a lower transparent films formed, respectively, on an upper and a lower sides of the housing, a first attaching member formed on an upper surface of the housing at a side of the upper transparent film, a corrugated header extended from the housing at a side of the first attaching member, a cover connected to the housing at the side of the first attaching member and positioned at a back of the corrugated header, a second attaching member formed on an upper surface of the cover, and a light tube unit heat-fused to the upper transparent film. The water proof case for a digital camera of the present invention accomplishes enhanced sealing firstly by successive folding of the corrugated header or clip attachment to the corrugated header and secondly by binding of the second attaching member formed on the cover to the first attaching member of the housing. Further, the water proof case provides high quality image and can be prepared in a cost effective manner.

4 Claims, 4 Drawing Sheets

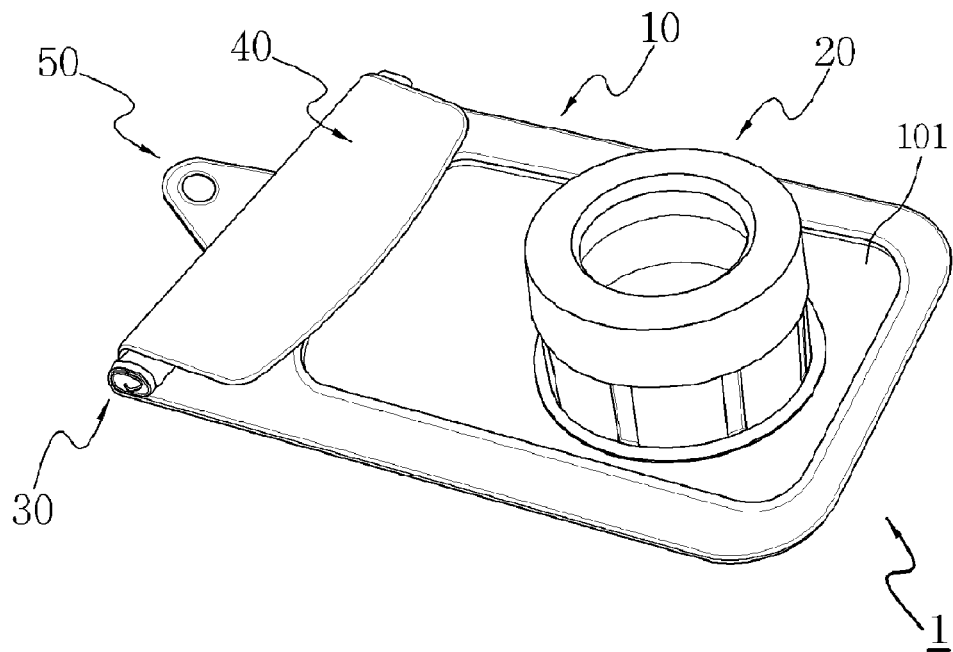
[Fig. 1]
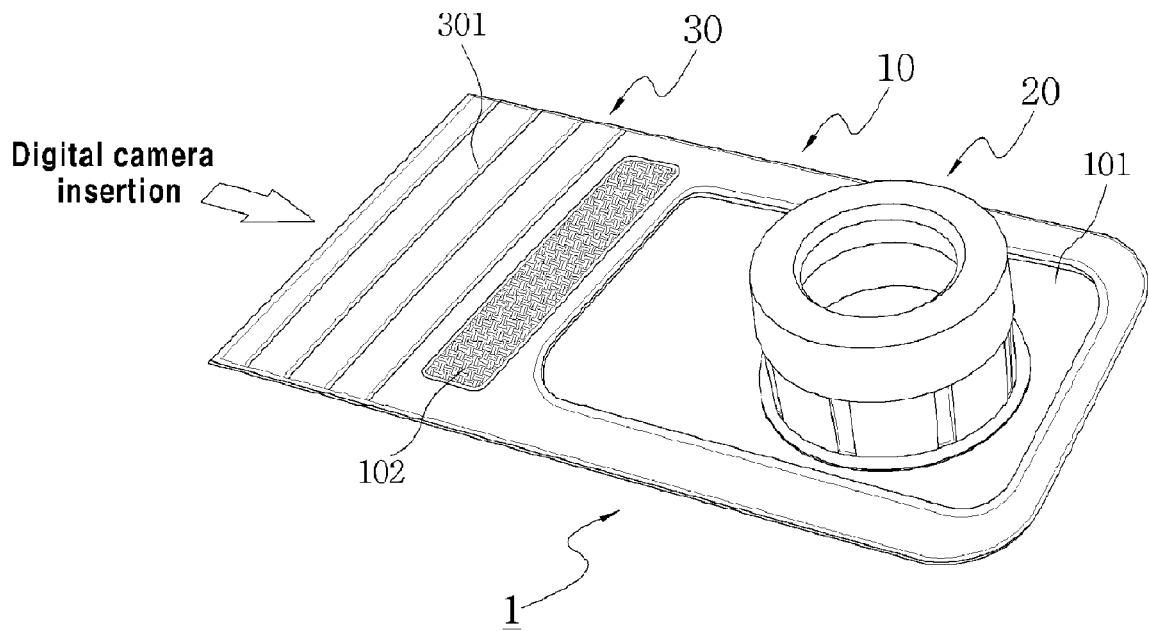
[Fig. 2]

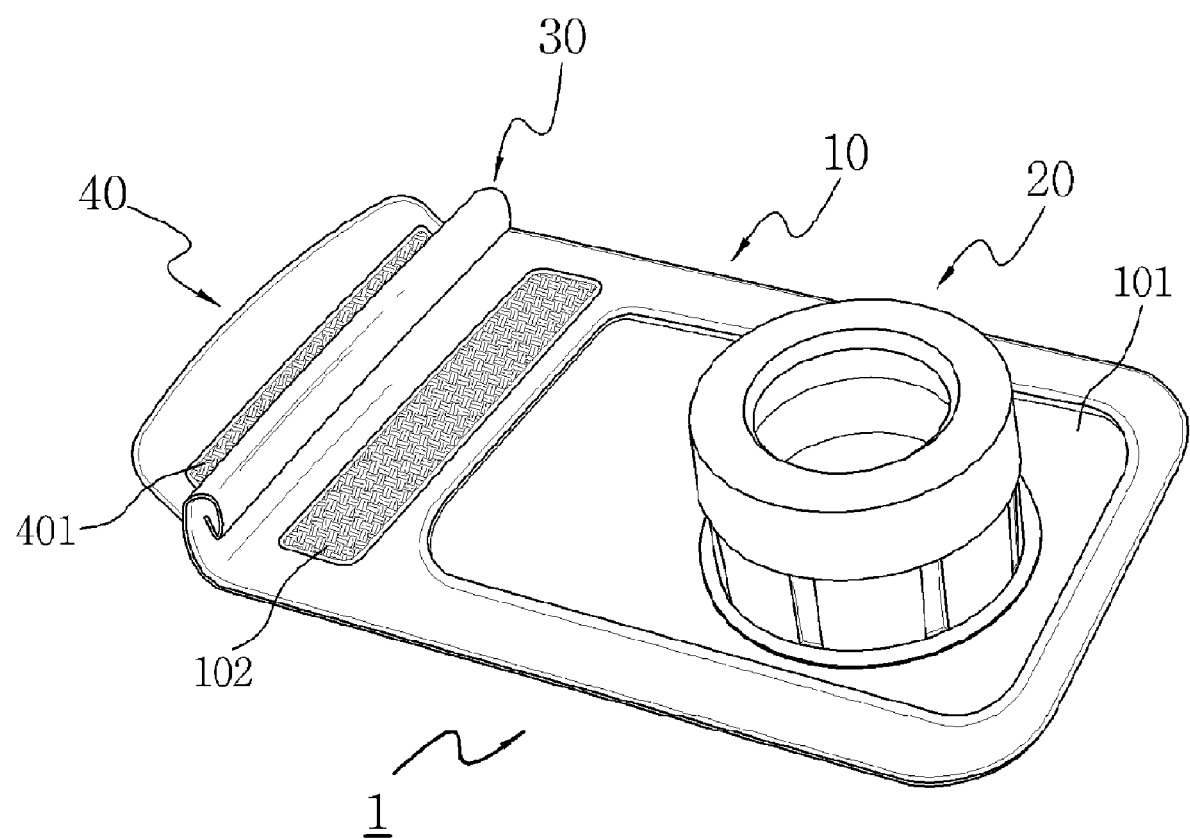
[Fig. 3]

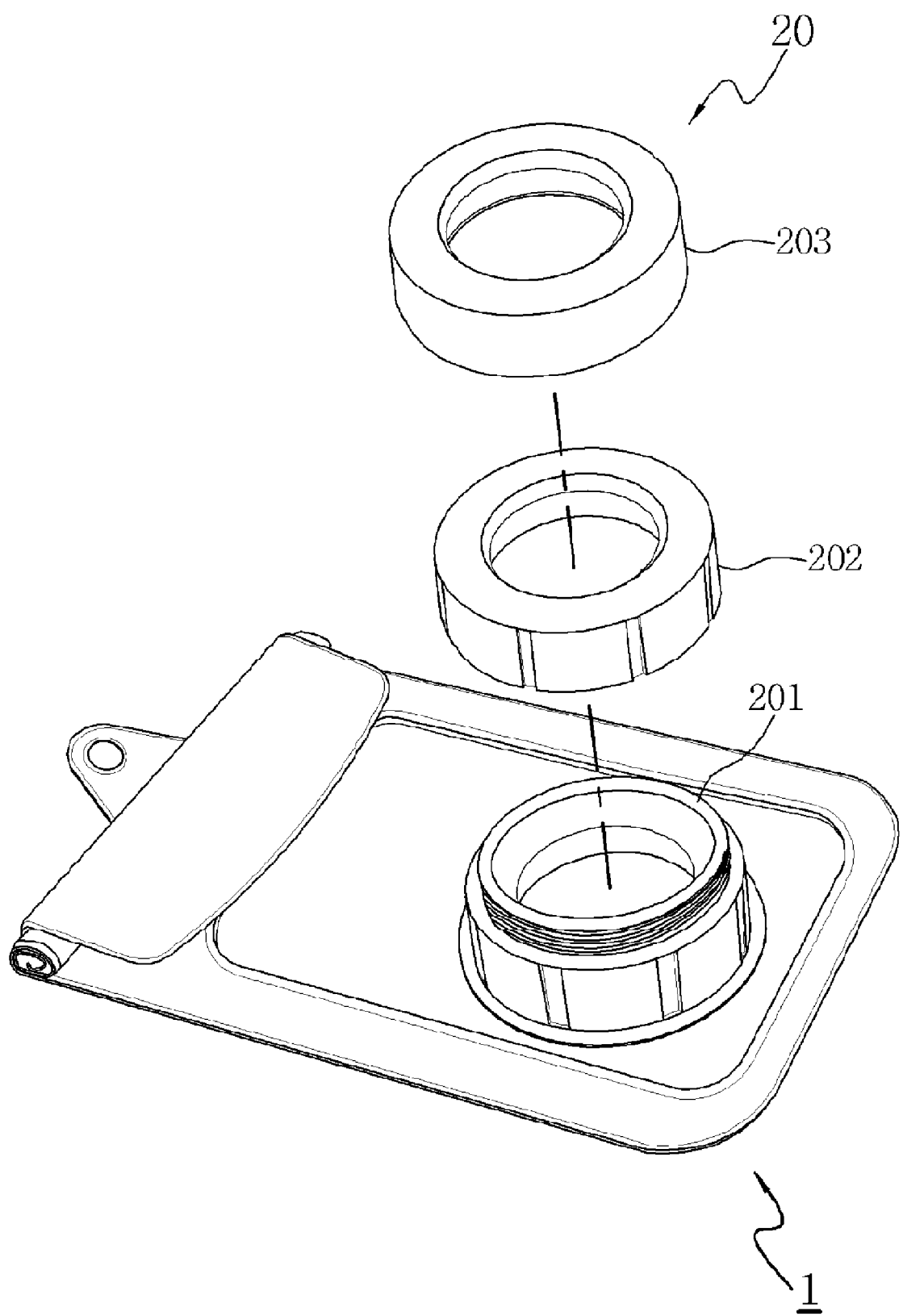

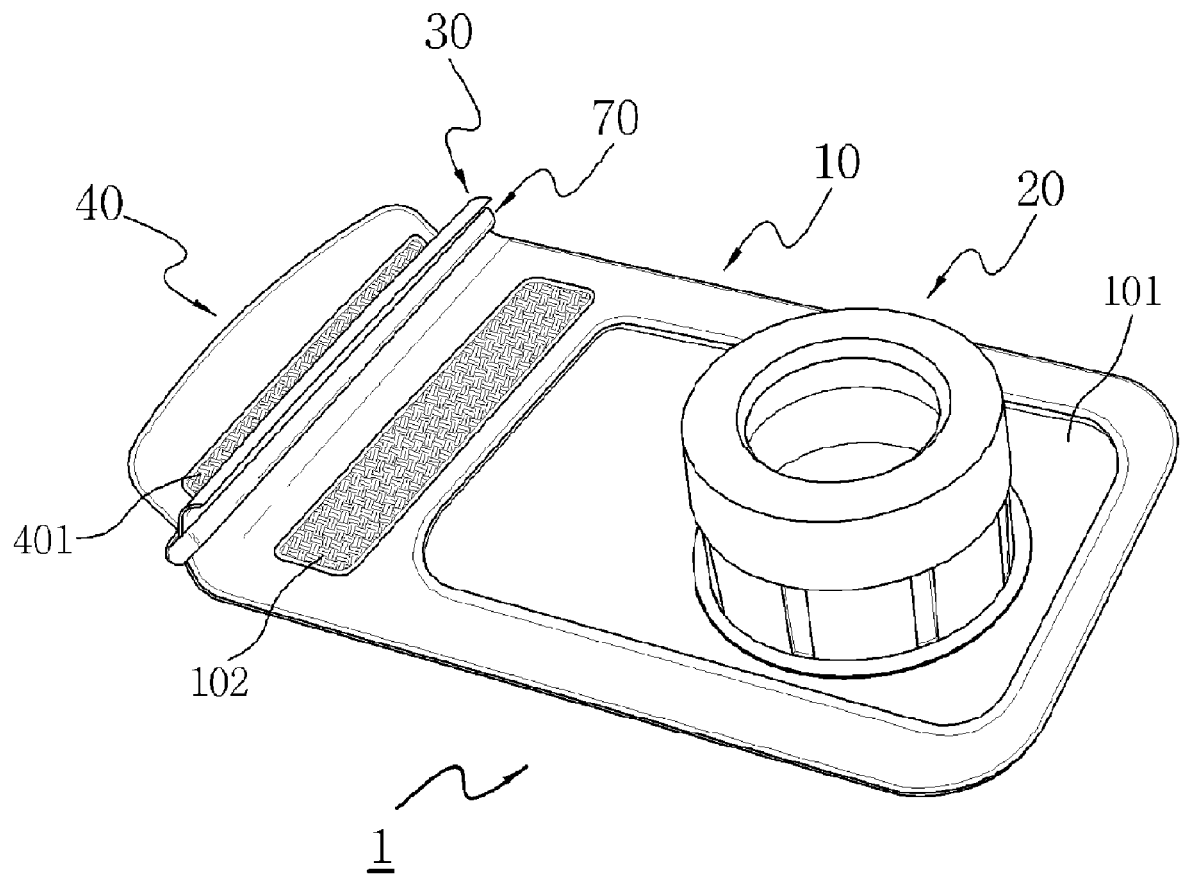
[Fig. 5]
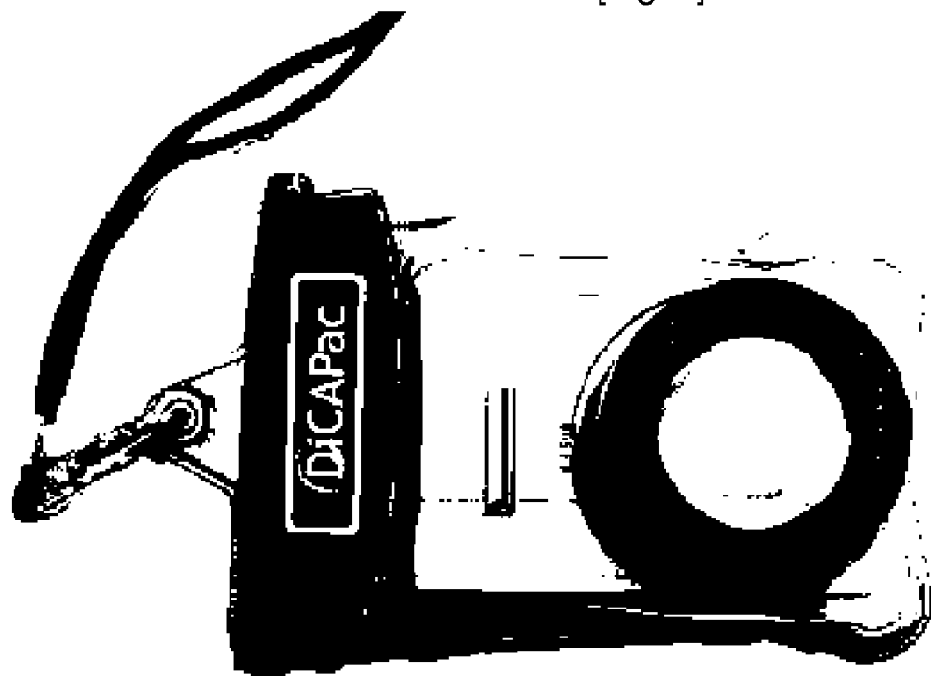
[Fig. 6]

WATER PROOF CASE FOR DIGITAL CAMERA

TECHNICAL FIELD

The present invention relates to a water proof case for a digital camera. More specifically, the present invention relates to a water proof case for a digital camera used for the purpose of protecting the digital camera from water or sand at riverside or seaside.

BACKGROUND ART

Digital cameras are being widely distributed in replacement with conventional analogue cameras. The digital camera takes an image in a digital form and stores the image into storage. Such a digital camera requires no physical films, and provides easy transmission and correction of the image. The digital camera typically comprises a main body inside which a chip for processing the image data and storage for storing the data are installed, a lens system for taking the image, various manipulation buttons including a shutter, and a LCD (Liquid Crystal Display) screen for displaying the image to a user.

The digital camera requires careful attention for not being exposed to the moisture such as water or rain. Particularly, the chip that processes the image data is sensitive to the moisture. When the digital camera is dropped into water, the chip might be damaged. This accident is one major cause that makes the digital camera out of order.

For these reasons, water proof cases were suggested for the purpose of protecting the digital camera from the exposure to the water. With regard to specific examples of the water proof cases, please refer to Korean utility model registration Nos. 365,091 and 359,424. Even though various water proof cases including the ones disclosed in the '091 and '424 utility models were suggested, most of them are expensive and applicable only to a specific model of the digital camera. In order to avoid such problems, vinyl pack type water proof cases were also suggested. However these vinyl pack type water proof cases were suffered from a disadvantage of insufficient water proof performance at an inlet and a lens unit housing position. Particularly, high quality image was not obtainable when pictured inside the vinyl water proof case.

DISCLOSURE OF INVENTION

Technical Problem

Extensive studies have been attempted to develop more practical, more efficient and high qualified water proof case for a digital camera. Therefore, in order to solve the problems of the conventional water proof cases, an object of the present invention is to provide a water proof case for a digital camera that provides superior water proof performance, low cost, high quality image and easy manipulation even when the digital camera is housed therein.

Technical Solution

According to the preferred embodiment of the present invention, there is provided a water proof case for a digital camera comprising a housing having an inner space to accommodate the digital camera, an upper and a lower transparent films formed, respectively, on an upper and a lower sides of the housing, a first attaching member formed on an upper surface of the housing at a side of the upper transparent film, a corrugated header extended from the housing at a side of the first attaching member, a cover connected to the housing at the side of the first attaching member and positioned at a back of the corrugated header, a second attaching member formed on an upper surface of the cover, and a light tube unit heat-fused to the upper transparent film.

Herein, the light tube unit is preferably comprised of an opaque plastic light tube body heat-fused to the upper transparent film, a transparent plastic light tube head connected to the light tube body, and a light tube cover made of a flexible rubber that surrounds the light tube head except for a front region of the light tube head such that penetration of a light is allowable only through the front region of the light tube head. The light tube head binds to the light tube body by a screw type connection, and the light tube cover is connected to the light tube head in a form to surround exterior of the light tube head with an inner surface of the light tube cover.

Advantageous Effects

The water proof case according to the present invention provides more enhanced sealing of the inner space of the housing, by two complementary sealing mechanisms consisting of the first sealing of the successive folding or clip attachment to the corrugated header and the second sealing of the binding of the second attaching member formed on the cover to the first attaching member of the housing. And, the light tube unit, comprising an opaque plastic light tube body heat-fused to the upper transparent film, a transparent plastic light tube head connected to the light tube body, and a light tube cover made of a flexible rubber that surrounds the light tube head except for a front region of the light tube head such that penetration of a light is allowable only through the front region of the light tube head, provides an improved image. Further, except for the light tube unit, the remaining components such as the housing, the corrugated header, the cover and the string fixation member can be made of cheap vinyl material, which saves the cost.

BRIEF DESCRIPTION OF THE DRAWINGS

FIG. 1 is a perspective view showing the preferred embodiment of the water proof case for a digital camera in accordance with the present invention.

FIG. 2 is a perspective view showing the preferred embodiment of the water proof case for a digital camera in accordance with the present invention, in which a corrugated header is unfolded and flatten.

FIG. 3 is a perspective view showing the preferred embodiment of the water proof case for a digital camera in accordance with the present invention, in which a corrugated header is being folded.

FIG. 4 is a perspective view showing the preferred embodiment of the water proof case for a digital camera in accordance with the present invention, in which a light tube unit is expressed in a resolved form.

FIG. 5 is a perspective view showing another preferred embodiment of the water proof case for a digital camera in accordance with the present invention, in which a corrugated header is clip-attached FIG. 6 is a photographic image showing a specific embodiment of the water proof case for a digital camera in accordance with the present invention, in which a digital camera is accommodated into the water proof case.

MODE FOR THE INVENTION

Hereinafter, the present invention will be more fully illustrated referring to the accompanied drawings.

FIG. 1 is a perspective view showing the preferred embodiment of the water proof case for a digital camera in accordance with the present invention. As shown in FIG. 1, the water proof case 1 for a digital camera of the present invention comprises a housing 10 having an inner space to house the digital camera, a light tube unit 20 to protect a lens system that is projected from a main body of the digital camera at a start of picture-taking, a corrugated header 30 extended from the housing 10, and a cover 40 to seal up the housing 10.

As shown in FIG. 1, the housing 10 comprises an upper transparent film and a lower transparent film, expressed as the same reference numeral 101, respectively at an upper side and a lower side of the housing 10. At a side of the upper transparent film 101, a first attaching member 102 is formed on the surface of the housing 10. User can check whether the digital camera is adequately accommodated or not, through the upper transparent film 101. The lower transparent film 101 is for a LCD (liquid crystal display) screen located at a rear of the digital camera. The user can check whether a subject to be pictured is adequately positioned or not, by viewing the image displayed on the LCD screen through the lower transparent film 101.

The light tube unit 20 protects a lens system that is projected from a main body of the digital camera at a start of picture-taking. The construction of the light tube unit is one of the distinguishing points of the present invention. FIG. 4 is a perspective view showing the preferred embodiment of the water proof case for a digital camera in accordance with the present invention, in which the light tube unit 20 is expressed in a resolved form. As shown in FIG. 4, the light tube unit 20 is comprised of a light tube body 201, a light tube head 202, and a light tube cover 203. The light tube body 201 is heat-fused to the upper transparent film 101. The light tube body 201 is preferably made of an opaque plastic material. If the light tube body is made of a transparent material, high quality image is not obtainable because a light penetrates through the light tube body 201. To the contrary, the light tube head 202 is preferably made of a transparent plastic material, in order to take an image through the front region thereof. The light tube cover 203 is preferably made of a flexible rubber and surrounds the light tube head 202 except for the front region of the light tube head 202 such that penetration of a light is allowable only through the front region of the light tube head 202. Preferably, the light tube head 202 binds to the light tube body 201 by a screw type connection, and the light tube cover 203 is connected to the light tube head 202 in a form to surround the exterior of the light tube head 202 with the inner surface of the light tube cover 203. In order to increase sealing ability, O-ring (not shown) can be inserted between the light tube head 202 and the light tube body 201, which is well known in the art. With the complementary combination of the light tube body 201, the light tube head 202, and the light tube cover 203, more improved quality of the image can be obtainable, even at an underwater shooting.

FIG. 2 is a perspective view showing the preferred embodiment of the water proof case for a digital camera in accordance with the present invention, in which a corrugated header was unfolded and flatten, and FIG. 3 is another perspective view showing the preferred embodiment of the water proof case for a digital camera in accordance with the present invention, in which the corrugated header is being folded. Referring FIGS. 2 and 3, accommodation of the digital camera into the water proof case 1 will be illustrated in detail. The digital camera (not shown) is inserted into an inner space of the housing 10 through an end of the corrugated header 30 extended from the housing 10. Then, the corrugated header 30 is successively folded along a corrugated line 301, and the rolled corrugated header 30 is closely adhered to the housing 10. As the rolled corrugated header 30 makes a close contact with the housing 10, a first sealing is attained. The cover 40 is positioned at the back of the corrugated header 30. On the upper surface of the cover 40, a second attaching member 401 is formed. With the binding between the first attaching member 102 of the housing 10 and the second attaching member 401 formed on the cover 40, a second sealing is attained.

In a meanwhile, the first sealing can be attained by clip attachment to the corrugated header 30, instead of successive folding of the corrugated header 30. FIG. 5 shows specific embodiment of the clip attachment. As shown in FIG. 5, a clip 70 is attached to the corrugated header 30, thereby accomplishing the first sealing. Thereafter, the second attaching member 401 formed on the cover 40 binds to the first attaching member 102 of the housing 10 to complete the sealing of the housing 10. If necessary, the first sealing can be achieved by a combination of successive folding of the corrugated header 30 and clip attachment to the corrugated header 30.

With aid of two complementary sealing mechanisms, consisting of the first sealing of the successive folding or clip attachment to the corrugated header 30 and the second sealing of the binding of the second attaching member 401 formed on the cover 40 to the first attaching member 102 of the housing 10, more enhanced sealing to the inner space of the housing can be attainable. This is another distinguishing point of the present invention. The two complementary sealing mechanisms provides safe underwater shooting. When the water proof case 1 inside which the digital camera is accommodated is positioned under the sea, the inner space of the housing 10 expands due to water pressure. This reinforces intimate contact between the corrugated header 30 and the cover 40 such that more increased sealing is attained. Therefore, the water proof case 1 inside which the digital camera is accommodated can be usefully applicable to the underwater shooting.

Unexplained reference numeral 50 is a string fixation member to which a portable string is fixed through a hole formed inside the member 50. This increases the portability of the water proof case inside which the digital camera is accommodated. FIG. 6 is a photographic image showing a specific embodiment of the water proof case for a digital camera in accordance with the present invention, in which a digital camera is accommodated into the water proof case. In the FIG. 6, real use of the water proof case is specifically exemplified.

As described, it should be evident that the present invention can be implemented through a variety of configurations in the aforementioned technical field without affecting, influencing or changing its spirit and scope of the invention. Therefore, it is to be understood that the examples and applications illustrated herein is intended to be in the nature of description rather than of limitation.

The invention claimed is:
1. A water proof case for a digital camera, comprising:
   a) a housing having an inner space to accommodate the digital camera;
   b) an upper transparent film and a lower transparent film formed, respectively, on an upper side and a lower side of the housing;
   c) a first attaching member formed on an upper surface of the housing at a side of the upper transparent film;
   d) a corrugated header extended from the housing at a side of the first attaching member;

e) a cover connected to the housing at the side of the first attaching member and positioned at a back of the corrugated header;
f) a second attaching member formed on an upper surface of the cover; and
g) a light tube unit heat-fused to the upper transparent film.

2. The water poof case as shown in claim 1, wherein the light tube unit is comprised of an opaque plastic light tube body heat-fused to the upper transparent film, a transparent plastic light tube head connected to the light tube body, and a light tube cover made of a flexible rubber that surrounds the light tube head except for a front region of the light tube head such that penetration of a light is allowable only through the front region of the light tube head.

3. The water poof case as shown in claim 2, wherein the light tube head is connected to the light tube body by a screw type connection, and the light tube cover is connected to the light tube head in a form to surround exterior of the light tube head with an inner surface of the light tube cover.

4. The water poof case as shown in claim 1, wherein the corrugated header is successively folded or clip-attached to attain a first sealing of the inner space of the housing, and the second attaching member formed on the cover binds to the first attaching member of the housing to attain a second sealing of the inner space of the housing.

* * * * *